United States Patent
Pearson (10) Patent No.: US 9,075,641 B2
(45) Date of Patent: *Jul. 7, 2015

(54) MOBILE DEVICES HAVING A PLURALITY OF VIRTUAL INTERFACES

(71) Applicant: AT&T Intellectual Property I, L.P., Atlanta, GA (US)

(72) Inventor: Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/918,013

(22) Filed: Jun. 14, 2013

(65) Prior Publication Data

US 2013/0283268 A1    Oct. 24, 2013

Related U.S. Application Data

(63) Continuation of application No. 12/818,923, filed on Jun. 18, 2010, now Pat. No. 8,468,550.

(51) Int. Cl.
*G06F 3/00* (2006.01)
*G06F 9/44* (2006.01)
*G06F 9/46* (2006.01)
*G06F 13/00* (2006.01)
*G06F 9/455* (2006.01)

(52) U.S. Cl.
CPC ............ *G06F 9/45504* (2013.01); *G06F 9/455* (2013.01)

(58) Field of Classification Search
None
See application file for complete search history.

(56) References Cited

U.S. PATENT DOCUMENTS

| 6,411,697 | B1 | 6/2002 | Creamer |
|---|---|---|---|
| 6,687,362 | B1 | 2/2004 | Lindquist et al. |
| 7,472,381 | B2 | 12/2008 | Fox |
| 7,568,203 | B2 | 7/2009 | Dotan |
| 2003/0204550 | A1 | 10/2003 | Lutter |
| 2004/0128394 | A1 | 7/2004 | Knauerhase et al. |
| 2008/0040716 | A1 | 2/2008 | Lam |
| 2008/0307409 | A1 | 12/2008 | Lu |
| 2010/0146504 | A1 | 6/2010 | Tang |
| 2010/0235833 | A1 | 9/2010 | Huang et al. |
| 2010/0333088 | A1 | 12/2010 | Rogel et al. |
| 2011/0016534 | A1* | 1/2011 | Jakobsson et al. ............... 726/28 |

OTHER PUBLICATIONS

U.S. Office Action dated Aug. 17, 2012 in U.S. Appl. No. 12/818,923.
U.S. Notice of Allowance dated Feb. 11, 2013 in U.S. Appl. No. 12/818,923.
U.S. Supplemental Notice of Allowance dated Mar. 12, 2013 in U.S. Appl. No. 12/818,923.

* cited by examiner

*Primary Examiner* — Craig Dorais
(74) *Attorney, Agent, or Firm* — Hartman & Citrin LLC (57) ABSTRACT

Mobile devices, systems and methods are described with a plurality of virtual machines, wherein each virtual machine executes a separate virtual interface, or guest operating system. Each guest operating system corresponds to a different virtual device having its own contact list, applications, and so on. A virtual "device" can be controlled by an employer or service provider, and is a secure space that provides authenticated applications that are walled off from another virtual device. A host operating system provides a hardware abstraction layer. A proxy server on the host operating system receives an incoming signal from a remote device on the external network, and routes the incoming signal to one of the first and second virtual machines based on a call context. A method and computer program product for providing a plurality of virtual interfaces on a mobile device are also disclosed.

20 Claims, 10 Drawing Sheets

MOBILE DEVICES HAVING A PLURALITY OF VIRTUAL INTERFACES

CROSS-REFERENCE TO RELATED APPLICATIONS

This application is a continuation of and claims priority to U.S. patent application Ser. No. 12/818,923, entitled "Mobile Devices Having Plurality of Virtual Interfaces," filed Jun. 18, 2010, now U.S. Pat. No. 8,468,550, which is incorporated herein by reference in its entirety.

BACKGROUND OF THE INVENTION

1. Field of the Invention

The present invention relates to mobile devices. More specifically, the present invention relates to mobile devices having plurality of virtual interfaces.

2. Background of the Invention

Mobile devices are proliferating across the market. End users are dealing with the complexity of bridging their work life and personal life. These users are dealing with information overload, and are being subject to too many calls, messages, and emails. They have to balance their personal contacts and their business contacts, their personal email and business email, their personal calendar and their business calendar, and different security needs of business applications and consumer applications.

Notably, an increasingly common trend is for users to carry multiple devices for different purposes. A corporation might issue enterprise devices to their employees, for instance, a Blackberry®. Since certain features on the issued Blackberry® may be locked, users may also maintain personal devices to store personal contacts, download music and videos, and execute applications. However, maintaining separate devices is cumbersome. Not only does the user incur hassles such as separate billing and maintenance for each device, the user also has two separate phone numbers, which is redundant considering that the same person answers both phones.

Some users have resorted to using multiple network interfaces, such as Subscriber Identity Module (SIM) cards, on a single device. This is not an ideal solution as physical actions need to be taken in order to swap the SIM card for different purposes. Also, this solution is not feasible for receiving calls from different types of contacts—only one "phone" is active at one time. Also, the user still has to deal with multiple addresses or phone numbers, one for each SIM card.

Virtualization is becoming increasingly popular on computers these days. A computer can run several instances of the same or different operating systems by providing each instance with a "virtual machine," or a virtual set of hardware resources mediated by an underlying software layer. However, virtualization on mobile devices is not widely practiced or fully understood.

What is needed is a simple and effective way to provide call processing for different contexts for a single user without having to deal with multiple devices.

SUMMARY OF THE INVENTION

The present invention addresses the above-identified problems in the conventional art by providing a plurality of virtual device interfaces on a single device, allowing the end-user to navigate seamlessly between their business and personal connections. In exemplary embodiments of the present invention, a mobile device is provided with a plurality of virtual machines, wherein each virtual machine executes a separate virtual interface, or guest operating system. Each guest operating system corresponds to a different virtual device, for instance, an enterprise guest operating system. The enterprise guest operating system corresponds to an enterprise or business-related device having its own enterprise contact list, enterprise applications, etc. Similarly, a personal guest operating system corresponds to a user's personal device, and has its own personal contact list, personal applications, etc. The enterprise "device" is controlled by an employer or service provider, and is a secure space that provides authenticated applications that are walled off from the personal "device." Similarly, employers may be unable to access data generated by use of the personal guest operating system. Moreover, the present invention is device agnostic, i.e. the virtual interfaces can be installed on any mobile device using the described methods. A user can access all of their enterprise and personal applications using any mobile device. Virtual machine migration enables a user to create and delete their enterprise and personal connected life on any device on a real time basis.

In one exemplary embodiment, the present invention is a mobile device having a plurality of virtual interfaces, the mobile device comprising a processor, a network interface, a display, a memory, a first virtual machine on the memory, the first virtual machine running a first guest operating system and a first security model, and a second virtual machine on the memory, the second virtual machine running a second guest operating system and a second security model. The mobile device further comprises a host operating system on the memory, the host operating system providing each of the first and second virtual machines with a first and second hardware abstraction layer. Each hardware abstraction layer emulates a plurality of hardware resources to each of the virtual machines, the plurality of hardware resources including a virtual processor core, a memory management unit, and a virtual network interface. A proxy server on the host operating system receives an incoming signal from a remote device on the external network and routes the incoming signal to one of the first and second virtual machines based on a call context.

In another exemplary embodiment, the present invention is a method for providing a plurality of virtual interfaces on a mobile device, the mobile device including a host operating system, the host operating system including a proxy server, a dialer, a screen, and a call accepter. The method includes loading a first guest operating system on a first virtual machine and a second guest operating system on a second virtual machine, each virtual machine running on a corresponding hardware abstraction layer provided by the host operating system, each guest operating system having a virtual network address, receiving, at the proxy server, a request to initiate a connection between the mobile device and a remote device on an external network, selecting one of the first and second guest operating systems as an endpoint for the connection, said selection based on a connection context of the request, focusing the screen to the selected guest operating system, and initiating a connection between the selected guest operating system and the remote device.

In another exemplary embodiment, the present invention is a computer program product stored on a computer-readable medium on a mobile device, the mobile device including a screen and a host operating system, the host operating system including a proxy server, a dialer, and a call accepter. The computer program product includes computer-executable instructions for loading a first guest operating system on a first virtual machine and a second guest operating system on a second virtual machine, each virtual machine running on a corresponding hardware abstraction layer provided by the host operating system, each guest operating system having a virtual network address, receiving, at the proxy server, a request to initiate a connection between the mobile device and a remote device on an external network, selecting one of the first and second guest operating systems as an endpoint for the connection, said selection based on a connection context of the request, focusing the screen to the selected guest operating system, and initiating a connection between the selected guest operating system and the remote device.

DETAILED DESCRIPTION OF THE INVENTION

The present invention addresses the above-identified problems by providing a plurality of virtual device interfaces on a single device, allowing the end-user to navigate seamlessly between their business and personal connections. In exemplary embodiments of the present invention a mobile device is provided with a plurality of virtual machines, wherein each virtual machine emulates a different hardware platform, or a hardware abstraction layer. A guest operating system running on each virtual machine presents a virtual interface on a display of the mobile device, the virtual interface enabling a user to operate a particular set of applications. Each guest operating system corresponds to a different virtual device, for instance, an enterprise guest operating system. The enterprise guest operating system corresponds to an enterprise or business-related device having its own enterprise contact list, enterprise applications, and enterprise security model. Similarly, a personal guest operating system corresponds to a user's personal device, and has its own personal contact list, personal applications, and personal security model.

Further, a supervisory operating system or hypervisor mediates communication between each guest operating system and the underlying hardware of the mobile device, and between the guest operating systems and remote devices on the external network. For instance, a host operating system operating on the memory of the device allocates resources such as processor cores, memory units, and networking to the guest operating systems via a hardware abstraction layer. Further, the host operating system processes incoming and outgoing communication by including a proxy server to mediate connections. The host operating system also offers a basic interface, including a call accepter and a dialer, to convey to a user that a connection is being initiated. The proxy server on the host operating system then delegates the call processing to one of the plurality of guest operating systems, depending on the attributes of the connection, or a connection context. For instance, an incoming call from a business contact will be routed to the enterprise virtual interface. Other examples are provided in the embodiments described below.

"Mobile device," as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A mobile device also includes a network interface enabling the transceiver to connect to a network. One example of a network interface is a Subscriber Identity Module (SIM) card. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include Wi-Fi and Bluetooth® networks, with communication being enabled by hardware elements called "transceivers." Wireless communication devices may have more than one transceiver, capable of communicating over different networks. For example, a cellular telephone can include a GPRS transceiver for communicating with a cellular base station, a Wi-Fi transceiver for communicating with a Wi-Fi network, and a Bluetooth® transceiver for communicating with a Bluetooth® device. A network typically includes a plurality of elements that host logic for performing tasks on the network.

The present invention involves executing a plurality of virtual machines on a single mobile device. A "virtual machine" is a software implementation or "emulation" of a machine, i.e. a computer, which executes a computer program like a physical machine would. In other words, any program running within the emulated environment runs as if it were being run on the real hardware being emulated. There are several approaches to virtualization. Generally, a software layer provides the virtualization and mediates the sharing of the underlying hardware resources. This software layer could be a virtual machine monitor, supervisory operating system, or a hypervisor. This layer provides a software virtualization environment in which other software, including operating systems, can run with the appearance of full access to the underlying system hardware, but in fact such access is under the complete control of the hypervisor. By using a "hardware abstraction layer," the hypervisor will handle interrupts from the operating system to the processor, schedule processor time among the guest operating systems and allocate cores to virtual machines, manage devices and allocate memory.

Further, a hypervisor can provide a guest operating system with access to a generic network interface by translating those access calls to a particular device driver, said interface being shared between the different guest operating systems. Such "virtual network interfaces" enable the creation of a "virtual network" wherein each virtual machine has its own private unique network address to communicate with each other and with the hypervisor or host operating system. By managing the virtual network, logic on the hypervisor can be deployed to secure each virtual machine using a different security model, such that virtual machines are restricted from accessing data stored on each other's memory units.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figures 1A, 1B:
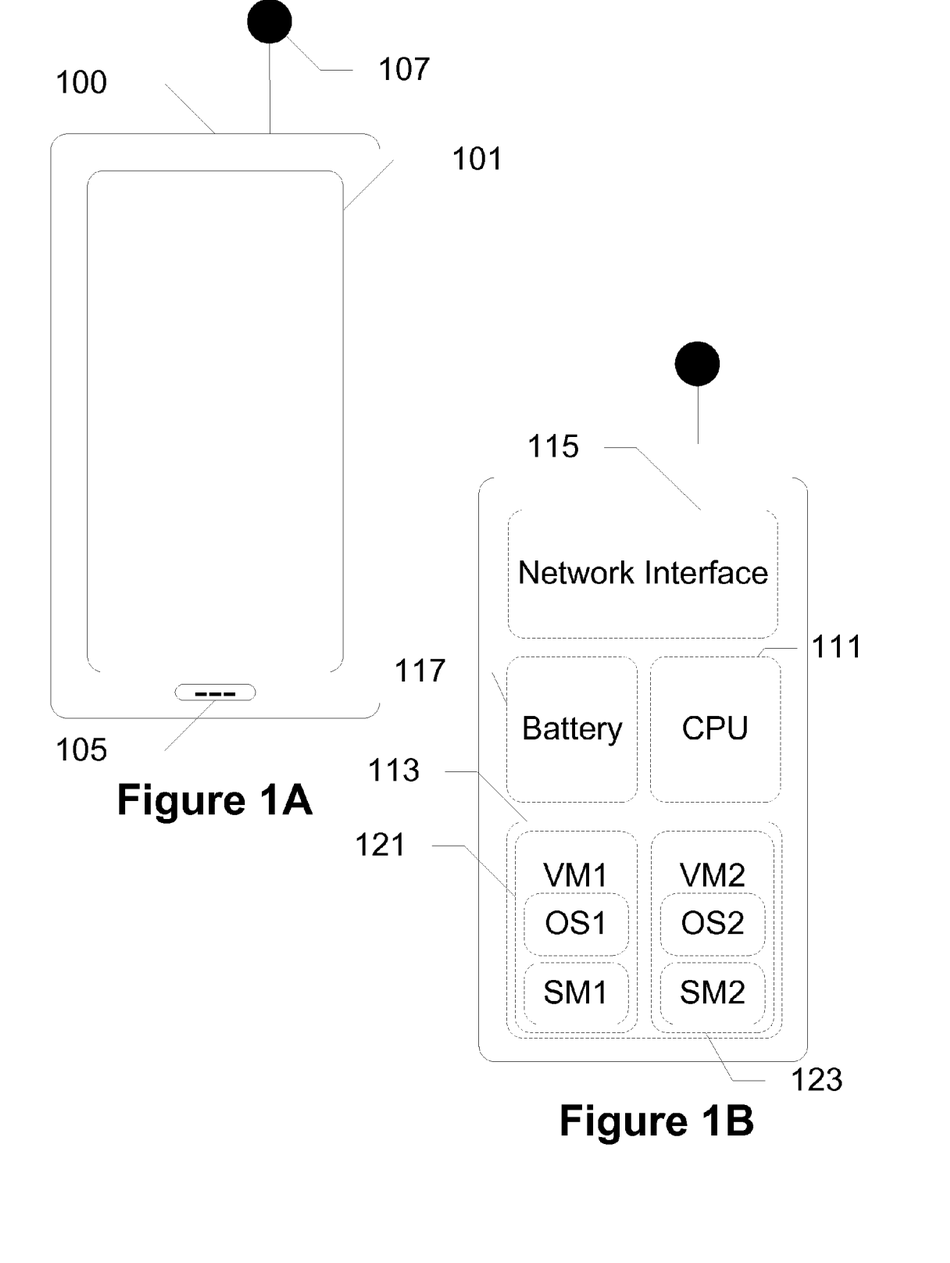
FIGS. 1A-1B show the components of a mobile device, according to an exemplary embodiment of the present invention.

FIG. 1 shows a mobile device 100 having a plurality of virtual machines, according to an exemplary embodiment of the present invention. FIG. 1A shows the exterior components of mobile device 100, including a display 101, a microphone 105, and an antenna 107. Display 101 is a touchscreen, enabling it to be used as both an input and an output device. Microphone 105 receives audio input for voice calls and commands. Antenna 107 receives cellular radio signals over the air to be processed by the internal components of mobile device 100. As is well-understood in the art, other features such as external speakers, input buttons/sliders, slide out keyboards, etc. are not shown but can be incorporated into other exemplary embodiments of the mobile device.

FIG. 1B shows the internal components of mobile device 100. A Central Processing Unit (CPU) 111 communicates with a memory 113 and a network interface 115, wherein all components are powered by a battery 117. CPU 111 is any Intel® or ARM® based microprocessor known in the art and ideal for operating portable electronic devices such as mobile device 100. Memory 113 stores the virtual machines 121 and 123. Memory 113 is used to store other software and databases, such as firmware, hypervisors, host operating systems, etc. Network interface 115 uses antenna 107 to receive, process, and transmit radio signals, such as GPRS, cellular radio, Bluetooth®, etc. Network interface 115 can be a SIM or U-SIM card.

In other exemplary embodiments, features such as Global Positioning System (GPS) units, accelerometers, infra-red (IR) transceivers, etc. are not shown but can be included in the mobile device. Other types of processors can be used and may take different forms depending on whether the mobile device is a cellular telephone, laptop computer, etc.

Figure 2:
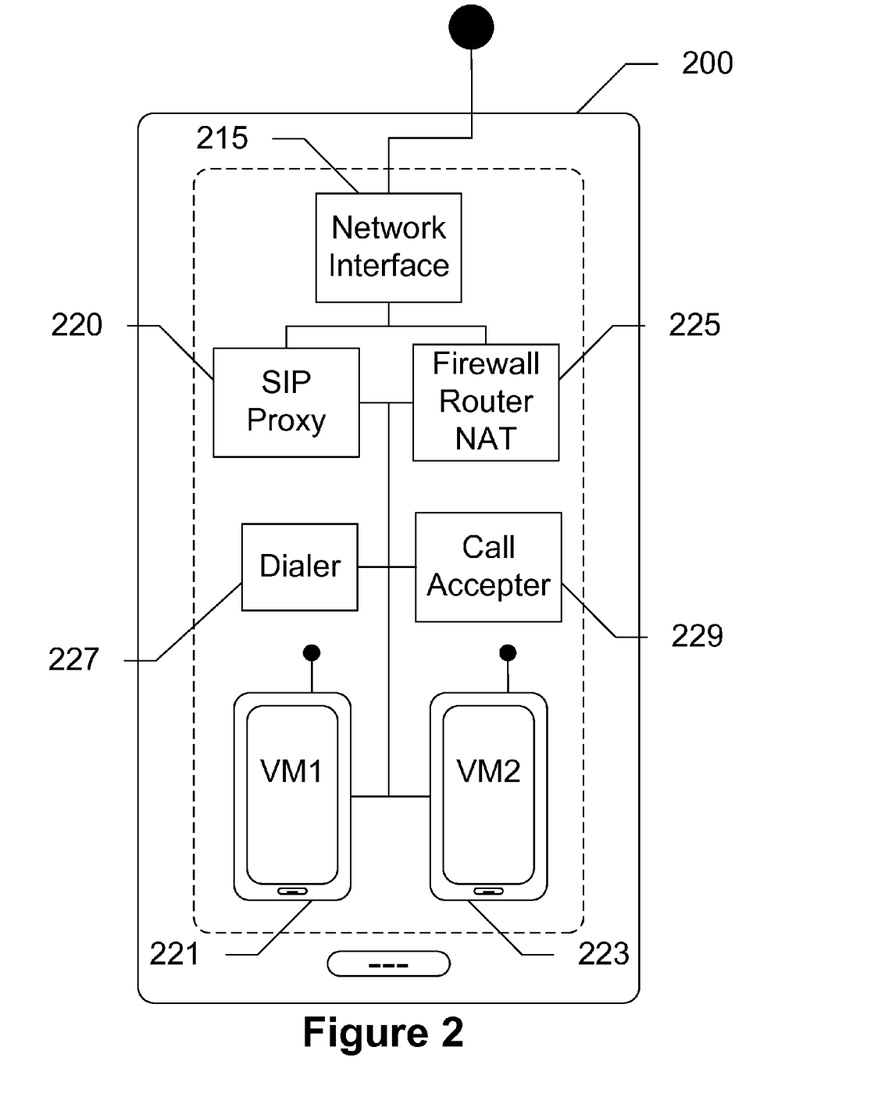
FIG. 2 shows a conceptual model of a mobile device having a plurality of virtual interfaces, according to an exemplary embodiment of the present invention.

FIG. 2 shows a model of a mobile device 200 having a plurality of virtual interfaces, according to an exemplary embodiment of the present invention. Mobile device 200 has a network interface 215, and a memory that stores a proxy server 220, a network address translator (NAT) 225, a dialer 227, a call accepter 229, and virtual machines 221 and 223. As described above, network interface 215 is any device that enables mobile device 200 to connect to an external network. An example is a SIM card enabling a cellular phone to connect to a cellular network. Proxy server 220 is a logical entity that routes incoming and outgoing connection requests, such as telephone calls, to one of the two virtual machines 221, 223, depending on a call context. Proxy server 220 employs call accepter 229 to indicate to a user of mobile device 200 the incoming call, and to await a response from the user. For outgoing connection requests, dialer 227 is employed to enable the user to dial a particular number or contact. NAT 225 is a logical entity that acts as a bridge between the virtual network within the device and the external network, enabling connections to appear to be from the network address, and not the virtual address, as described below. Virtual machines 221 and 223 provide virtual interfaces for a specific context, such as enterprise or personal. Each virtual machine operates a separate guest operating system having its own user interface, contacts, applications, business rules, security models, and virtual address. In essence, each virtual machine acts as a separate mobile device when it is delegated the display or screen "focus" by proxy server 220.

A call context is determined by referring to the business rules stored on the memory of device 200. The business rules are accessible by proxy server 220 and associate attributes of the connection request with a particular virtual machine. For instance, a call originating from a business contact is routed to an enterprise virtual machine. The attribute is extracted by proxy server 220, which refers to the business rules of each virtual machine, makes a determination as to which virtual machine or "context" should take the call, and delegates the call, as well as the screen focus, to the appropriate virtual machine. A separate call handling application within the virtual machine then takes over the call. The delegation is performed by forwarding the connection to the virtual address of the virtual machine. Since proxy server 220 employs NAT 225 to map the private or "virtual" address for itself and for each virtual machine 221, 223, connections are seamlessly received and sent from the internal virtual network (internal) to the external network. NAT 225 maps the virtual addresses to a single network address for mobile device 200. This ensures that a user of both virtual machines can send and receive calls from and to a single endpoint address, while maintaining a personal and a business context from the single device.

In some exemplary embodiments, business rules are varied and depend upon the needs of the enterprise service provider or employer, and the consumer. The business rule may be as simple as determining an address of the remote party, referring to the address book of each guest operating system to find a frequency of occurrence for the address, and determining call context based on the results. For instance, a business contact would have a stored entry in the enterprise operating guest system address book, but would be absent from the personal guest operating system address book. The choice is easy—the proxy server diverts the call to the enterprise virtual machine to be handled by a call management application on the enterprise guest operating system. Other rules are possible, for instance, depending on a time of day the connection request is received, or using geo-location features. For instance, when a user is in the office, all incoming calls are routed to the enterprise virtual machine unless this feature is overridden by the user (as described below). Alternatively, any outgoing calls placed after 5 PM will be initiated by the personal guest operating system. In further embodiments, a social graph is generated to reflect different contexts with different users and programmed into the business rules. Other directories are incorporated into the business rules such as corporate directories, customer relationship management systems, telephone number classifications, etc. Especially in exemplary embodiments featuring a mobile IP environment, several attributes of an incoming or outgoing connection request are extracted to determine a call context and make a subsequent routing determination. Further, a default rule can be set in case none of the business rules apply to a connection request.

Figure 3:
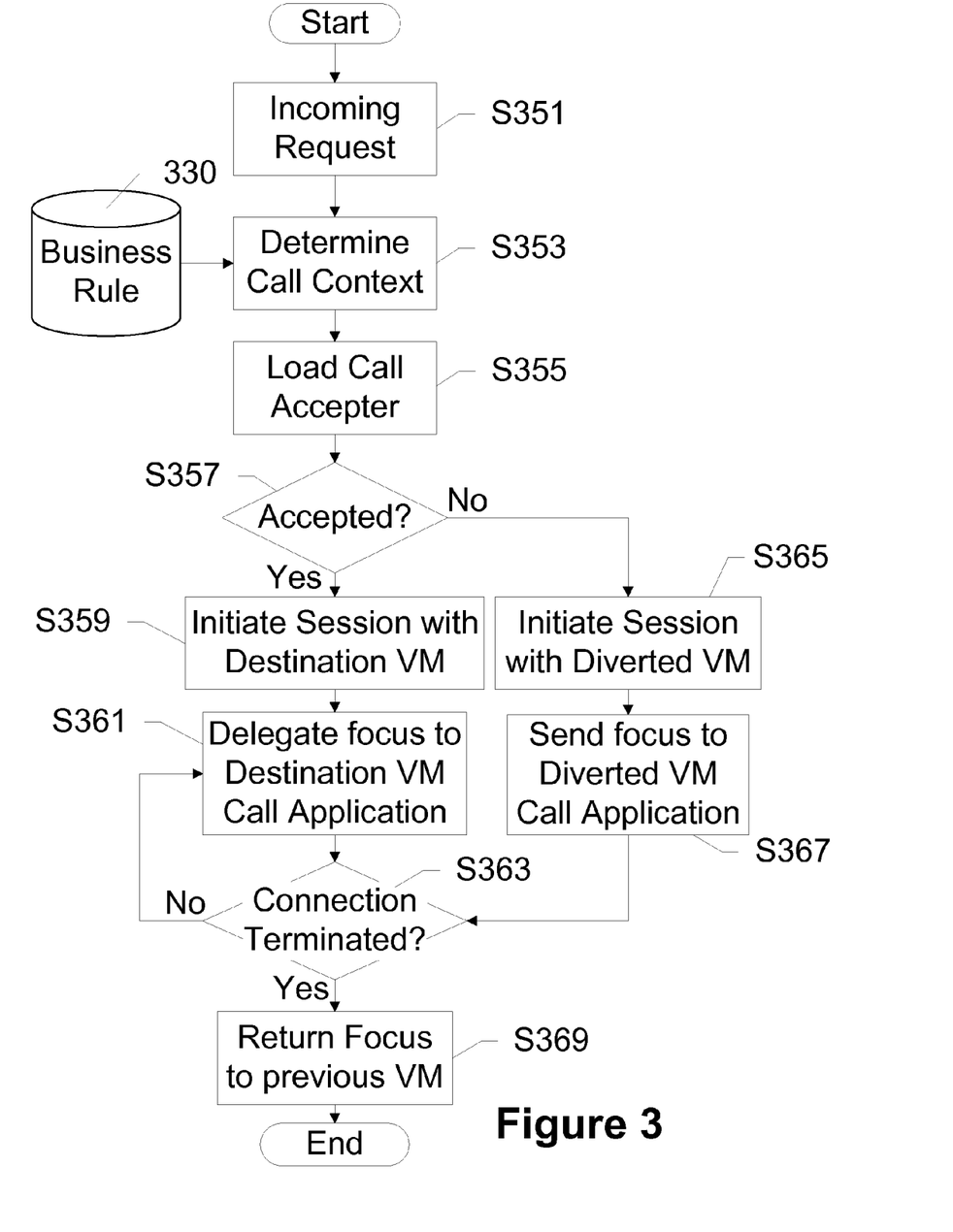
FIG. 3 shows a method for routing incoming calls to a guest operating system, according to an exemplary embodiment of the present invention.

FIG. 3 shows a method for routing incoming calls to a guest operating system, according to an exemplary embodiment of the present invention. Incoming connection request S351 is received from a remote device on an external network, for instance, a telephone call from another mobile device, or a Session Initiation Protocol (SIP) request from a remote IP address. The proxy server receives the incoming connection request and makes a determination of call context S353. This determination is performed by referring to business rules 330, which indicate whether the incoming connection request originated from, for instance, a business contact or a personal contact. Once the determination of context is made, the call accepter is loaded S355. This provides the user of the device with a prompt indicating the incoming connection request. The prompt includes the option S357 of either continuing the connection with the selected context, or diverting the call to an alternative context. If diverting is not selected, then the proxy server initiates a session with the destination virtual machine S359. The proxy server forwards the connection request to the destination virtual machine's virtual address using the virtual private network within the mobile device, and then bridges that connection with the connection initiated with the remote device. The focus is then delegated to a call management application within the guest operating system residing on the destination virtual machine S361. This allows the user to handle the call within the confines of the context of the call. Depending on the security model, the attributes of the call (duration, charges) will also be monitored and recorded by the guest operating system. When the call is terminated S363, the session is also terminated, and the screen focus is returned to the operating system that the user was using before the incoming connection request S369.

In the case that the user decided to override the selection of call context and divert the call to another virtual machine S357, a session is initiated with the diverted virtual machine S365 in a manner analogous to the one described above. Further, screen focus is delegated to the diverted virtual machine S367, until the connection is terminated S363. At this point, screen focus remains with or is transferred S369 to the original guest operating system that was in use before the incoming connection request.

In the above exemplary embodiment, the decision S357 is optional. In other exemplary embodiments, the session is initiated with the selected context without requiring a decision. Other means of bridging the connection between the virtual machine and the remote device will become apparent to those having skill in the art.

Figure 4A:
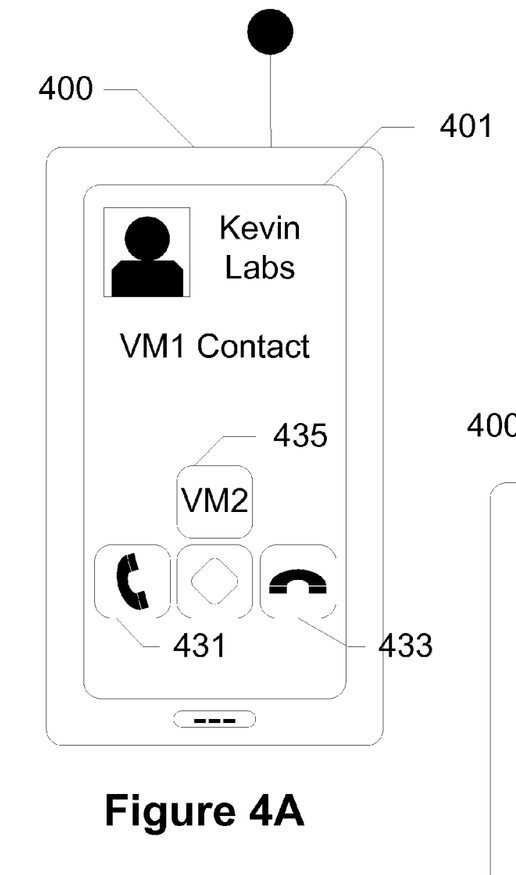
FIGS. 4A-4B show a call accepter receiving an incoming call and transferring the focus to a guest operating system, according to an exemplary embodiment of the present invention.
Figure 4B:
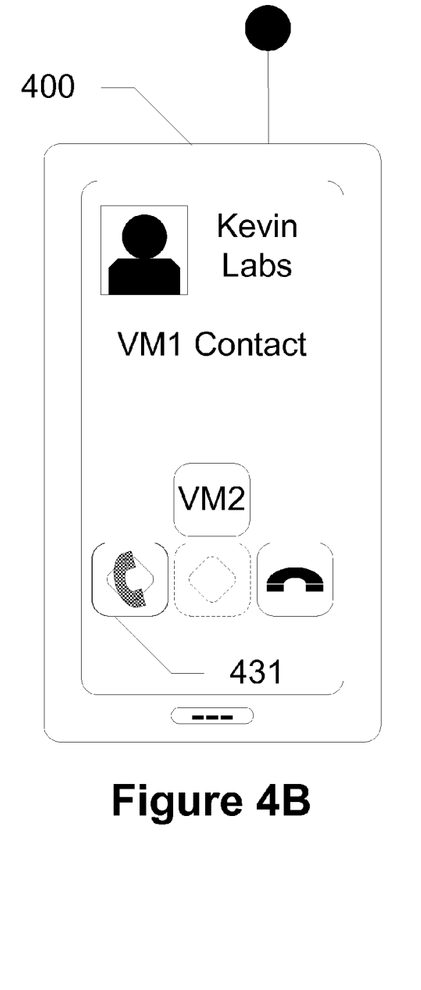

FIGS. 4A-4B show a call accepter receiving an incoming call and transferring the focus to a guest operating system, according to an exemplary embodiment of the present invention. A mobile device 400 has a display 401, showing the screen focus on the call accepter. In FIG. 4A, an incoming connection request here takes the form of an incoming phone call from Kevin Labs, identified as a contact having the context of Virtual Machine 1. A user is presented with options to accept 431, reject 433, or divert 435 the phone call to Virtual Machine 2. The divert option corresponds to overriding the proxy server's determination of the call context. FIG. 4B shows the accept button 431 being highlighted, as the user accepts the call for virtual machine 1. The connection is then established with virtual machine 1, and the screen focus shifts to the guest operating system residing on virtual machine 1.

In other embodiments, the description of the contact can be any text string such as "enterprise contact," "personal contact," etc. Those having skill in the art will readily understand other means of selecting options including accept, reject, or diversion. For example, for mobile devices without a touch screen, manipulation of input buttons may select these options.

In an IP Multimedia System (IMS) environment, the proxy server includes a session border controller (SBC) that manages a Session Initiation Protocol (SIP) signaling interface between the external network and each of the virtual machines. The user has a single persona, identifiable by a unique telephone number or SIP address. Calls made from and to an external network entity traverse a session created between (a) the proxy server and the external entity, and (b) the virtual machine and the proxy server. The proxy server maintains SIP signaling between each of these elements.

Figure 5:
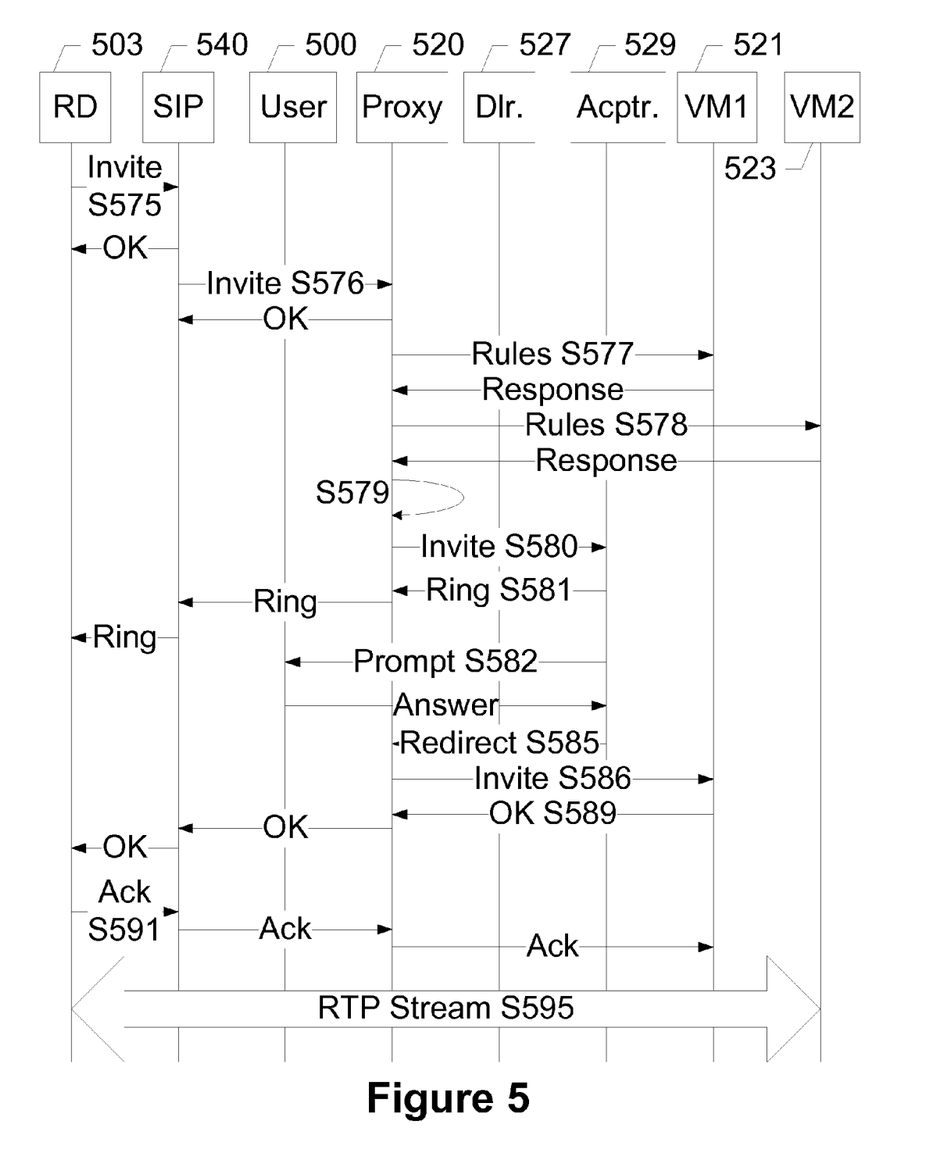
FIG. 5 shows a process flow diagram for routing incoming calls in an IMS environment, according to an exemplary embodiment of the present invention.

FIG. 5 shows a process flow diagram for routing incoming calls in an IMS environment, according to an exemplary embodiment of the present invention. A remote device 503 on the network can transmit SIP messages to a SIP server 540. In this exemplary embodiment, SIP server 540 is a serving call session control function (S-CSCF), a SIP server having session control capabilities. SIP server 540 handles SIP registrations, inspects and forwards SIP messages, etc. SIP server 540 communicates with a proxy server 520, which is part of user 500's mobile device as described above. Proxy server 520 in turn communicates with a Dialer 527, a Call Accepter 529, Virtual Machine 521 and Virtual machine 523.

The flow initiates with a SIP invite message S575 received from remote device 503 at SIP server 540. SIP server 540 responds with an OK message, determines that the Invite is destined to proxy server 520 operated by a user 500. The Invite is cascaded S576 to proxy 520, with an OK being transmitted for every invite message. Proxy 520 initiates the process for determining which virtual machine to use for the invite. This involves invoking business rules and applying them to each virtual machine. Rules S577 are invoked with Virtual Machine 521, for instance, comparing the address of Remote Device 503 with an address book stored on Virtual Machine 521. Virtual Machine 521 responds with results of the comparison, and then Rules S578 are invoked with respect to Virtual Machine 523, followed by a response. Proxy 520 processes the results of this business rule comparison from both virtual machines and determines to which virtual machine to route the invite S579. After a determination has been made, proxy 520 invokes Call Accepter 529 via an Invite message S580. Call accepter 529 sends a signal to the proxy server 520 to ring S581 which cascades through the network to the SIP server 540 and from the SIP server 540 to the remote device 503. Call accepter 529 prompts user 500 to accept or reject the call S582. When answered, Call Accepter 529 redirects the process S585 to Proxy 520. Proxy 520 proceeds to invite Virtual Machine 521 to accept the call S586. Virtual Machine 521 responds with OK S589, which is cascaded all the way via the network, including SIP server 540, until it reaches Remote Device 503. Remote Device 503 acknowledges the OK via Ack message S591, which in turn cascades through the network to arrive at Proxy 520. Once this signaling process is completed via the Invite, OK, and ACK messages, Proxy 520 creates a connection S595 between Virtual Machine 521 and Remote Device 503 in order to exchange data such as voice data, etc. In this embodiment, connection S595 is a real-time transport protocol (RTP) stream in Voice over IP (VoIP). Screen focus is delegated to virtual machine 521 until the call is completed. Upon completion, screen focus returns to the virtual machine that user 500 was active before Invite S575.

Alternatively, rules S577 and S578 can be invoked after invite S580 is submitted to call accepter 529. Other rules may be applied as well. Alternatively, call accepter 529 includes within prompt S582 an option for user 500 to select which virtual machine should connect with remote device 503. Alternatively, proxy 520 redirects the invite to a separate call accepter application within the guest operating system residing on virtual machine 521. The connection stream can be a real-time transport protocol (RTP) stream in Voice over IP (VoIP) or similar applications.

Figure 6:
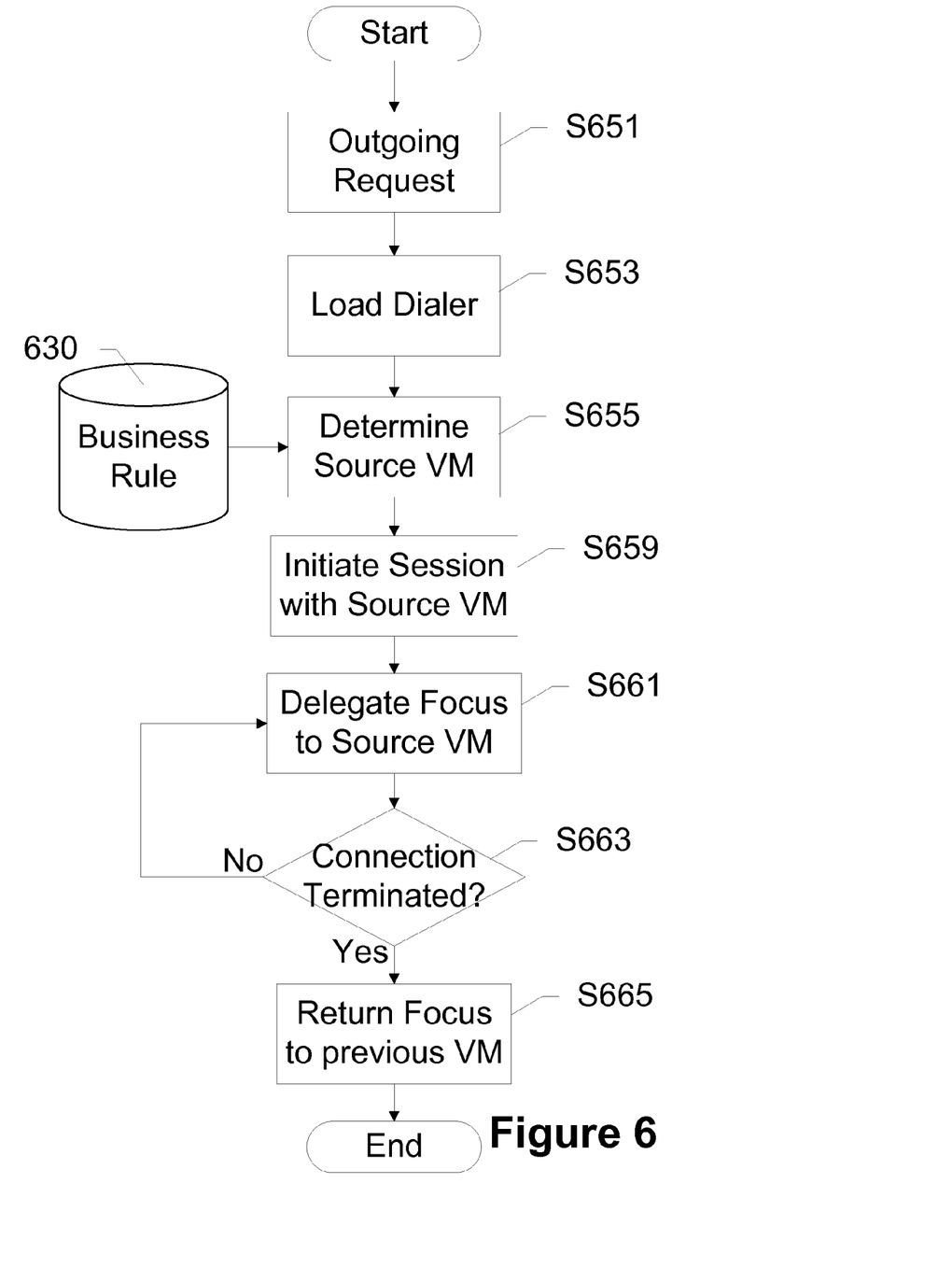
FIG. 6 shows a method for routing outgoing calls from a guest operating system, according to an exemplary embodiment of the present invention.

FIG. 6 shows a method for routing outgoing calls from a guest operating system, according to an exemplary embodiment of the present invention. Outgoing connection request S651 is generated by a user of the mobile device attempting to dial out to a remote device on an external network. This can happen, for instance, by selecting a "dial" command from a touchscreen, by pushing a "dial" button, or by accessing an address book stored on the virtual machine. A dialer is loaded S653 upon detecting the user's intention to connect. The dialer can also have access to the address book for one or more virtual machines. The dialer forwards the outgoing connection request to the proxy server, which makes a determination of call context S655. This determination is performed by referring to business rules 630, which correlate the destination address or some other attribute of the outgoing connection request to a specified call context. For instance, a business contact is correlated with an enterprise context, or an enterprise virtual machine, or calls placed while the user is located in the office are sourced from the enterprise virtual machine.

Once the determination of context is made, the proxy server initiates a session between the selected source virtual machine S659 associated with the determined context and the remote device. The proxy server forwards the outgoing connection request from the internal virtual private network within the mobile device out to the external network via a NAT, transceiver, and potentially other elements. Screen focus is delegated to a call management application within the guest operating system residing on the source virtual machine S661. This allows the user to handle the phone call within the confines of the context of the call, i.e. from the enterprise guest operating system residing on the enterprise virtual machine. Depending on the security model, the attributes of the call (duration, charges) will also be monitored and recorded by the guest operating system. When the call is terminated S663, the session is also terminated, and the screen focus is returned S665 to the guest operating system that the user was using before the incoming connection request.

Alternatively, the user can override the selection of call context via an option provided by the dialer in step S653 and initiate the call from another guest operating system. Screen focus will be delegated to the diverted virtual machine, until the connection is terminated S663. At this point, screen focus remains with or is transferred to the original guest operating system that was in use before the incoming connection request.

Figure 7A:
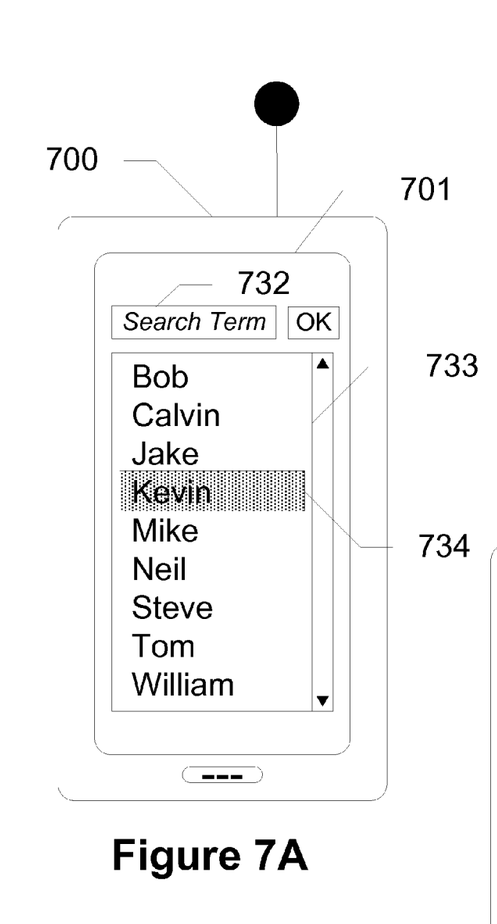
FIGS. 7A-7B show a dialer initiating an outgoing call and transferring the focus to a guest operating system, according to an exemplary embodiment of the present invention.
Figure 7B:
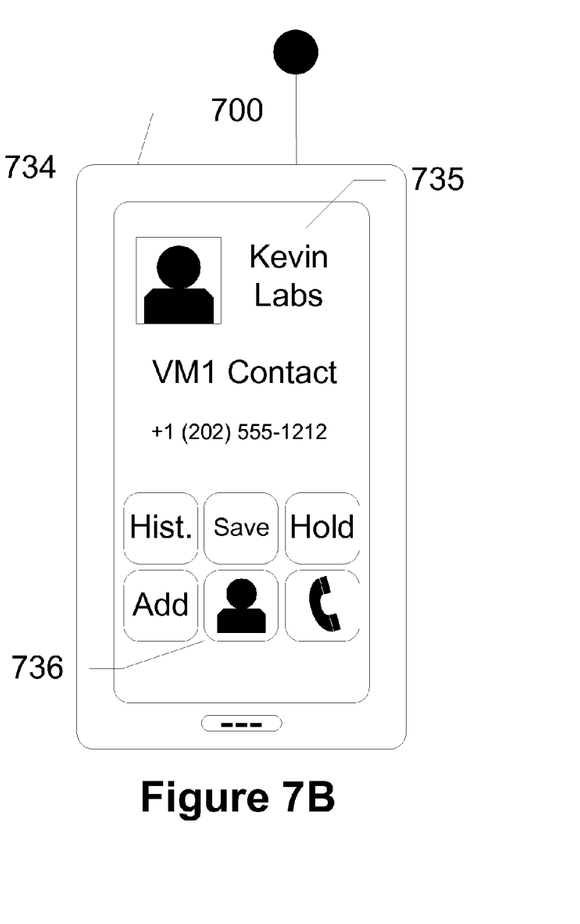

FIGS. 7A-7B show a dialer initiating an outgoing call and transferring the focus to a guest operating system, according to an exemplary embodiment of the present invention. A mobile device 700 has a display 701, showing the screen focus on the dialer application using an address book to initiate an outgoing connection. In FIG. 7A, a user either types in a search term in field 732, or simply chooses from a list 733. The user chooses to dial Kevin 734, and the dialer shown in FIG. 7B takes a screen focus 735 identifying Kevin Labs as being a contact associated with the context of VM1 or virtual machine 1. Buttons 736 enable the user to navigate dialer options such as saving numbers, checking a dial history, etc. Upon completing the initiation, the connection is then established with virtual machine 1, and the screen focus shifts to the guest operating system residing on virtual machine 1.

Other configurations of the dialer are possible. For instance, in other exemplary embodiments the screen includes an option to override the determination of the virtual machine, and allows the user to select a guest operating system of their choice to handle the call. Alternatively, the dialer with the contact list delegates the call handling to a secondary dialer situated within the selected guest operating system. In either case, upon completing the call, the screen focus shifts back to the guest operating system that was being used before the outgoing connection was initiated.

Figure 8:
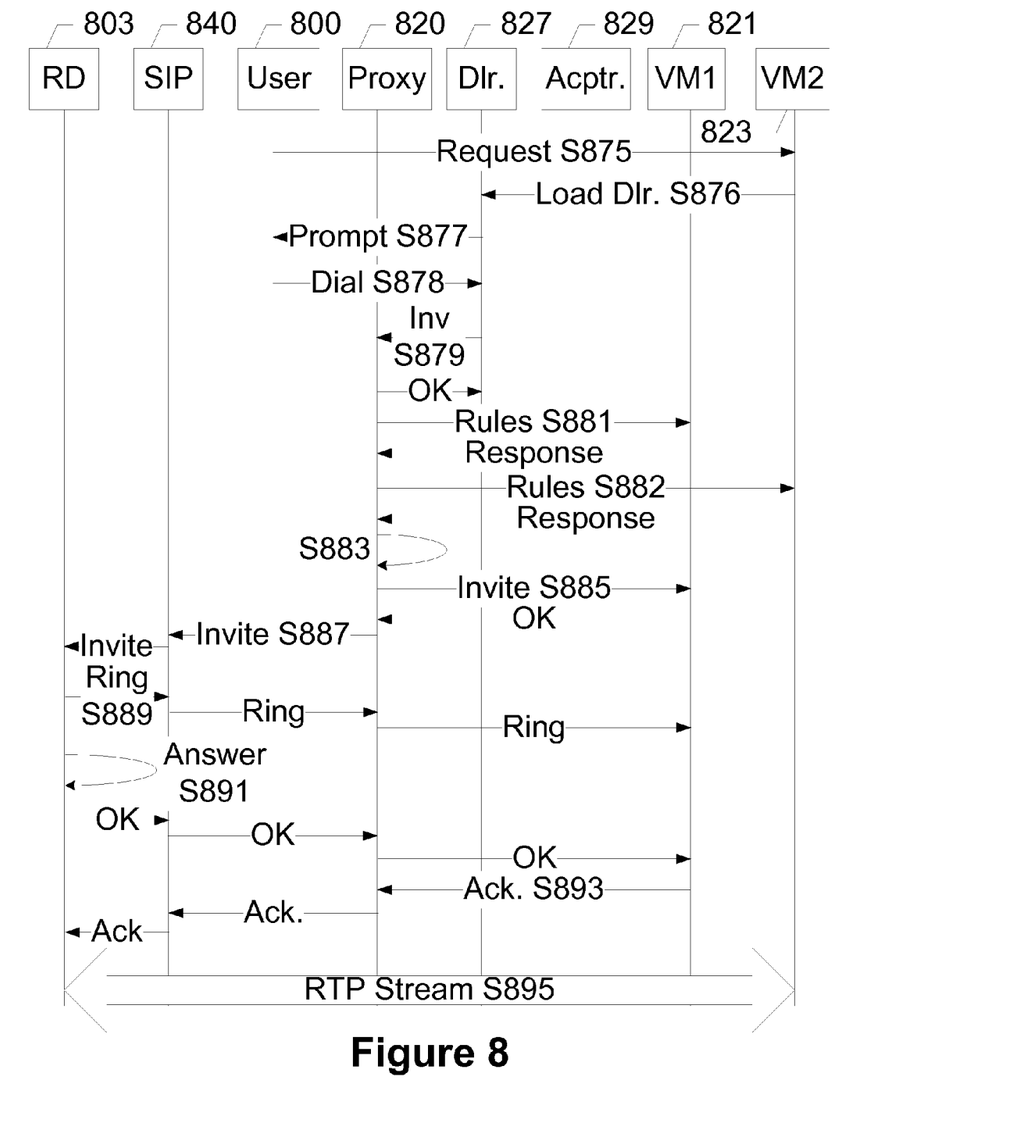
FIG. 8 shows a process flow diagram for routing outgoing calls in an IMS environment, according to an exemplary embodiment of the present invention.

FIG. 8 shows a process flow diagram for routing outgoing calls in an IMS environment, according to an exemplary embodiment of the present invention. Remote Device 803, SIP server 840, proxy server 820, user 800, Dialer 827, Call Accepter 829, Virtual Machine 821 and Virtual Machine 823 are in essence the same as those described in FIG. 5 and need not be elaborated upon here. The flow initiates with a request S875 submitted by user 800 indicating an intent to initiate an outgoing connection. Upon receiving the request at Virtual Machine 823 (currently in use by User 800), the Dialer 827 is loaded S876. As described herein, dialer 827 prompts a user S877 to dial a specific number, select a contact from an address book, etc. At step S878, user 800 has selected a contact or number to dial, and hits the dial button. Dialer 827 submits an invite S879 to proxy 820 to handle the session control.

Proxy 820 invokes rules S881 to determine a context with relation to virtual machine 821, and rules S882 to determine a context with relation to virtual machine 823. At step S883, proxy 820 processes the responses received from the virtual machines, and makes a determination as to the appropriate source virtual machine to handle the connection. In this case, proxy 820 submits an invite S885 to virtual machine 821 to handle the call. An OK message is received, and an invite S887, for instance a SIP invite message, is transmitted from proxy 820 to the external network, traversing SIP 840 and reaching remote device 803. The invite appears to originate from a unique address of user 800, independent of the virtual addresses of the virtual machines. Remote device 803 signals to SIP server 840 that remote device 803 is ringing S889, the signaling cascading through the network from SIP server 840 in the form of a SIP ring message, through proxy 820, and arrives at the call handler of the guest operating system residing on virtual machine 821. When virtual machine 821 receives the SIP ring message, a ring-back tone is played for user 800 utilizing virtual machine 821. The ring-back tone is a song or sound that is heard by the calling party, in this instance, user 800. The ring-back tone assures the calling party that a ringing signal is being sent on the called party's line.

At step S891, a user of remote device 803 answers the call, and an OK message traverses the network to reach virtual machine 821. The OK message is acknowledged S893. Once this signaling process is completed via the Invite, OK, and ACK messages, proxy 820 creates a connection S895 between Virtual Machine 821 and Remote Device 803 in order to exchange data such as voice data, etc. In this embodiment, connection S895 is a real-time transport protocol (RTP) stream in Voice over IP (VoIP). Screen focus is delegated to Virtual Machine 821 until the call is completed. Upon completion, screen focus returns to virtual machine 823 that was active before user submitted request S875.

Alternatively, rules S877 and S878 can be invoked after invite S879 is submitted to dialer 829. Alternatively, dialer 829 includes within prompt S882 an option for user 800 to select which virtual machine should connect with remote device 803. Alternatively, proxy 820 redirects the invite S879 to a separate dialer application within Virtual Machine 821. The connection between the virtual machine and the remote device can be a real-time transport protocol (RTP) stream in Voice over IP (VoIP) or similar applications.

As described herein, there are several approaches to virtualization. The present invention can be implemented using some of these methods in different configurations, as shown in FIGS. 9-12. With the exception of the Java Virtual Machine (JVM) of FIG. 12, all these implementations have a few features in common—the underlying hardware (including the network interface) has a unique network address, each virtual machine itself has a virtual private networking address, guest operating systems are isolated from each other, and proxy/call management/network address translation features operate outside the confines of the guest operating system, but are able to communicate with the guest operating system via signaling or other means.

Figure 9:
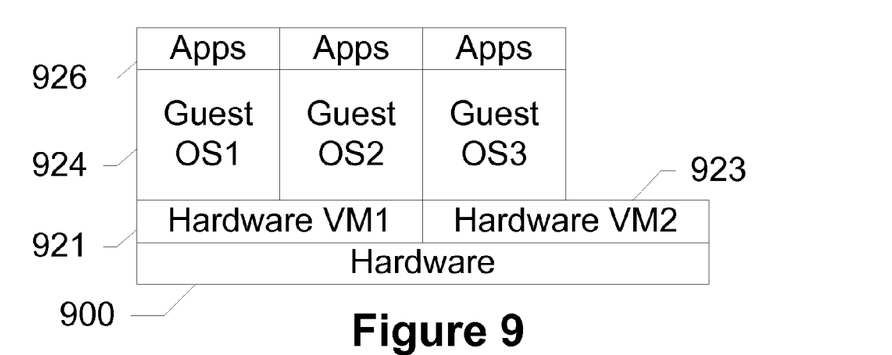
FIG. 9 shows a conceptual model of a mobile device having a plurality of virtual machines using a hardware emulation virtualization approach, according to an exemplary embodiment of the present invention.

FIG. 9 shows a conceptual model of a mobile device having a plurality of virtual machines using a hardware emulation virtualization approach, according to an exemplary embodiment of the present invention. Phone hardware 900 includes, among other components, a processor, memory, and a network interface. Hardware virtual machines 921 and 923 are quite simply programs running on hardware 900 that emulate hardware running on another computer. In this embodiment, hardware VM1 921 is a program that emulates a Windows Mobile® device, while hardware VM2 923 is a program that emulates an iPhone® device. Consequently, guest operating systems OS1-OS3 924 provide user interfaces and host applications 926 that are designed to be operated on the specific devices being emulated.

In other exemplary embodiments, the virtual machines emulate any operating system applicable.

Figure 10:
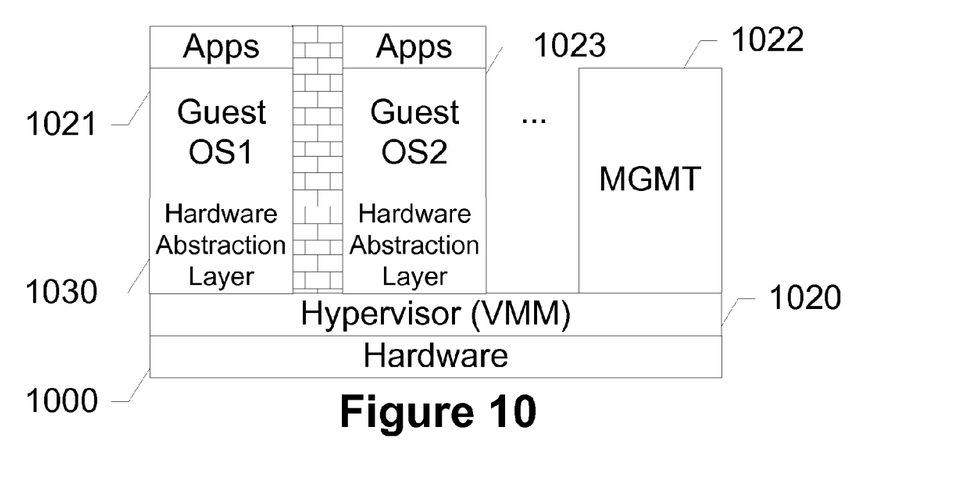
FIG. 10 shows a conceptual model of a mobile device having a plurality of virtual machines using a hypervisor virtualization approach, according to an exemplary embodiment of the present invention.

FIG. 10 shows a conceptual model of a mobile device having a plurality of virtual machines using a hypervisor virtualization approach, according to an exemplary embodiment of the present invention. Hypervisor 1020 is software that mediates between a guest operating system and underlying hardware 1000, as described above. Hypervisor 1020 provides one or more hardware abstraction layers 1030 that act as virtual machines. In other words, hypervisor 1020 allocates processor cores, memory modules, network interfaces, interrupts, and other resources, and provides a set of resources to Guest operating systems OS1 1021 and OS2 1023 via hardware abstraction layers 1030.

Further, management software 1022 operates directly atop hypervisor 1020, and provides features such as proxies, network address translation, etc., most of which are transparent to a user of hardware 1000. Guest operating systems OS1 and OS2 are able to communicate with hypervisor 1020 and management software 1022, but are blocked off from each other, because it appears to the guest OS that it is running on a separate hardware platform. Even though management software 1022 provides a virtual private network (VPN), and assigns virtual network addresses to each guest OS via hardware abstraction layers 1030, security models are imposed upon each guest operating system enabling it to communicate only with the layer immediately below it. This allows management software 1022 to communicate with each guest operating system separately when making a call routing determination based on business rules.

Figure 11:
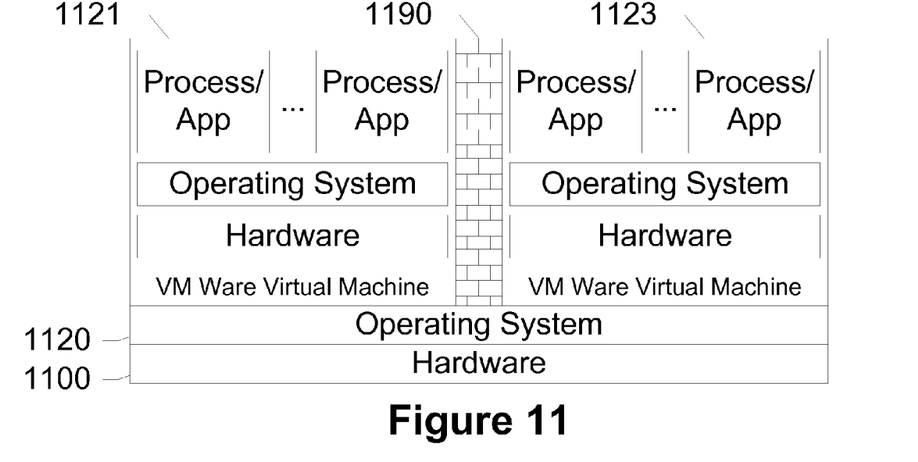
FIG. 11 shows a conceptual model of a mobile device having a plurality of virtual machines using an operating system virtualization approach, according to an exemplary embodiment of the present invention.

FIG. 11 shows a conceptual model of a mobile device having a plurality of virtual machines using an operating system virtualization approach, according to an exemplary embodiment of the present invention. In this approach, each virtual machine runs as a process under the control of an underlying operating system. The figure shows a VMWare® approach, wherein VMWare® virtual machines run as processes on a host operating system 1120, which runs directly on hardware 1100. Virtual machines 1121 and 1123 are processes that emulate specific hardware, hosting their own operating systems, and running their own applications. Further, virtual machines 1121 and 1123 are isolated from each other via a security firewall 1190. Virtual private network addresses are assigned to each virtual machine by operating system 1120, and proxy servers, dialers, call accepters, and other services can reside on operating system 1120 for efficient and seamless call routing to each virtual machine.

Figure 12:
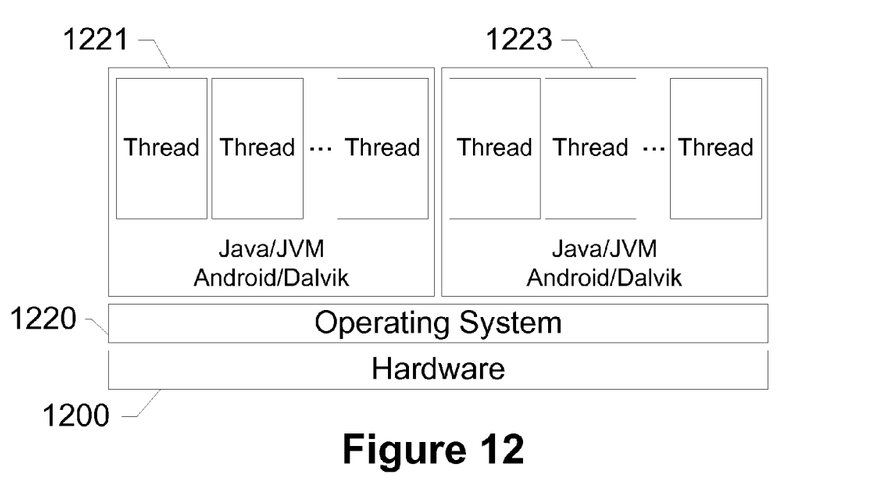
FIG. 12 shows a conceptual model of a mobile device having a plurality of Java Virtual Machines (JVM), according to an exemplary embodiment of the present invention.

FIG. 12 shows a conceptual model of a mobile device having a plurality of Java Virtual Machines (JVM), according to an exemplary embodiment of the present invention. This is also known as a "process virtualization" approach. An operating system 1220 resides on hardware 1200, and includes basic management software such as proxies, NAT, etc. Java virtual machines 1221 and 1223 reside on operating system 1220. Notably there is no "guest operating system" residing on the JVMs, rather, JVMs are more appropriate for running specific processes or threads. JVMs are easy to implement given that several types of mobile software already use JVMs and they are cheap. However, since there is no guest operating system on a JVM, it is not as effective to control the security/usage of each JVM from the part of the employer or service provider.

In conclusion, the present invention allows a user to choose who contacts them and under what circumstances. The user can dictate, for instance, that business contacts reach them via their mobile voice applications, family members reach them via voice, email and IM within a separate interface, and all other contacts reach them via email on a specific application. The present invention further allows for seamless progression from a voice call to a conference call to a web collaboration session or a video streaming. Call forwarding between virtual machines is possible, as is migration of virtual machines from one device to another without losing any precious data.

Finally, there is no need to modify networks to be compatible with specific devices, since all devices become "virtual" anyway.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A mobile device comprising;
   a processor;
   a memory that stores computer-executable instructions that, when executed by the processor, causes the processor to perform operations comprising
      executing a host operating system including a proxy server that transfers screen focus;
      loading a first guest operating system on a first virtual machine, the first virtual machine executing on a first hardware abstraction layer provided by the host operating system and having a first virtual network address;
      loading a second guest operating system on a second virtual machine, the second virtual machine executing on a second hardware abstraction layer provided by the host operating system and having a second virtual network address;
      receiving, at the proxy server of the host operating system, a request to initiate a connection between the mobile device and a remote device on an external network;
      selecting an endpoint for the connection, the selecting being based upon a connection context of the request, wherein the endpoint comprises one endpoint selected from a group of endpoints comprising the first guest operating system and the second guest operating system;
      transferring, by the proxy server, the screen focus to the endpoint selected; and
      initiating a connection between the endpoint selected and the remote device.

2. The mobile device of claim 1, wherein the request comprises an incoming connection request.

3. The mobile device of claim 2, wherein the computer-executable instructions, when executed by the processor, cause the processor to perform operations further comprising:
   receiving the incoming connection request at a call accepter;
   prompting a user to accept the incoming connection request; and
   transmitting the incoming connection request to the proxy server.

4. The mobile device of claim 1, wherein the request comprises an outgoing connection request.

5. The mobile device of claim 4, wherein the computer-executable instructions, when executed by the processor, cause the processor to perform operations further comprising:
   receiving the outgoing connection request at a dialer; and
   transmitting the outgoing connection request to the proxy server.

6. The mobile device of claim 1, wherein selecting the endpoint comprises:
   extracting a plurality of attributes from the request;
   comparing the plurality of attributes to a plurality of business rules; and
   selecting the endpoint based upon the comparing.

7. The mobile device of claim 6, wherein the plurality of attributes comprises a remote device network address.

8. The mobile device of claim 7, wherein the comparing comprises:
   retrieving an address book associated with each of the endpoints; and
   determining a frequency of occurrence of the remote device network address in the address book associated with each of the endpoints.

9. The mobile device of claim 1, wherein the memory stores a hypervisor.

10. The mobile device of claim 1, wherein the first virtual machine comprises a java virtual machine.

11. A method comprising:
   loading, by a mobile device that executes a host operating system comprising a proxy server that transfers screen focus, a first guest operating system on a first virtual machine, the first virtual machine executing on a first hardware abstraction layer provided by the host operating system and having a first virtual network address;
   loading, by the mobile device, a second guest operating system on a second virtual machine, the second virtual machine executing on a second hardware abstraction layer provided by the host operating system and having a second virtual network address;
   receiving, by the proxy server of the host operating system, a request to initiate a connection between the mobile device and a remote device on an external network;
   selecting, by the mobile device, an endpoint for the connection, the selecting being based upon a connection context of the request, wherein the endpoint comprises one endpoint selected from a group of endpoints comprising the first guest operating system and the second guest operating system;
   transferring, by the proxy server, the screen focus to the endpoint selected; and
   initiating a connection between the endpoint selected and the remote device.

12. The method of claim 11, wherein the request comprises an incoming connection request.

13. The method of claim 12, further comprising:
   receiving the incoming connection request at a call accepter;
   prompting a user to accept the incoming connection request; and
   transmitting the incoming connection request to the proxy server.

14. The method of claim 11, further comprising:
receiving the request at a dialer, wherein the request comprises an outgoing connection request; and
transmitting the outgoing connection request to the proxy server, wherein the proxy server transmits the outgoing connection request to the remote device.

15. The method of claim 11, wherein selecting the endpoint comprises:
extracting a plurality of attributes from the request;
comparing the plurality of attributes to a plurality of business rules; and
selecting the endpoint based upon the comparing, wherein the plurality of attributes comprises a remote device network address.

16. The method of claim 15, wherein the comparing comprises:
retrieving an address book associated with each of the endpoints; and
determining a frequency of occurrence of the remote device network address in the address book associated with each of the endpoints.

17. A computer-readable medium comprising computer-executable instructions that, when executed by a processor, cause the processor to perform operations comprising:
loading a first guest operating system on a first virtual machine, the first virtual machine executing on a first hardware abstraction layer provided by a host operating system having a first virtual network address, wherein the host operating system comprises a proxy server that transfers screen focus, and wherein the host operating system is executed by a mobile device;
loading a second guest operating system on a second virtual machine, the second virtual machine executing on a second hardware abstraction layer provided by the host operating system and having a second virtual network address;
receiving, by the proxy server of the host operating system, a request to initiate a connection between the mobile device and a remote device on an external network;
selecting an endpoint for the connection, the selecting being based upon a connection context of the request, wherein the endpoint comprises one endpoint selected from a group of endpoints comprising the first guest operating system and the second guest operating system;
transferring, by the proxy server, the screen focus to the endpoint selected; and
initiating a connection between the endpoint selected and the remote device.

18. The computer-readable medium of claim 17, wherein the computer-executable instructions, when executed by the processor, cause the processor to perform operations further comprising:
receiving the request at a call accepter, wherein the request comprises an incoming connection request;
prompting a user to accept the incoming connection request; and
transmitting the incoming connection request to the proxy server.

19. The computer-readable medium of claim 17, wherein the computer-executable instructions, when executed by the processor, cause the processor to perform operations further comprising:
receiving the request at a dialer, wherein the request comprises an outgoing connection request; and
transmitting the outgoing connection request to the proxy server, wherein the proxy server transmits the outgoing connection request to the remote device.

20. The computer-readable medium of claim 17, wherein selecting the endpoint comprises:
extracting a plurality of attributes from the request;
comparing the plurality of attributes to a plurality of business rules; and
selecting the endpoint based upon the comparing.

* * * * *